United States Patent [19]

Kang

[11] Patent Number: 4,657,309

[45] Date of Patent: Apr. 14, 1987

[54] WIRE WHEEL COVER

[75] Inventor: Lau-Wan Kang, Tainan, Taiwan

[73] Assignees: Yi-Ping Lin; Chun-Ming Kang, both of Taiwan

[21] Appl. No.: 855,014

[22] Filed: Apr. 22, 1986

[51] Int. Cl.⁴ .................................................. B60B 7/00
[52] U.S. Cl. ................................ 301/37 SS; 301/37 R; 301/37 CM
[58] Field of Search ............... 301/37 SS, 37 R, 37 P, 301/37 CM, 37 S

[56] References Cited

U.S. PATENT DOCUMENTS

| | | | |
|---|---|---|---|
| 3,843,201 | 10/1974 | Buerger | 301/37 SS |
| 4,178,043 | 12/1979 | Beisch et al. | 301/37 CM X |
| 4,576,415 | 3/1986 | Hempelmann | 301/37 S |
| 4,577,909 | 3/1986 | Browning | 301/37 SS X |

FOREIGN PATENT DOCUMENTS 2118491 11/1983 United Kingdom ............ 301/37 SS

Primary Examiner—Robert B. Reeves
Assistant Examiner—Russell D. Stormer
Attorney, Agent, or Firm—Townsend and Townsend

[57] ABSTRACT

A wire wheel cover assembly which includes a hub, a rim member and a plurality of spoke members extending between the hub and the rim member is assembled securely by first and second clamping members which generate cooperatively a clamping force to hold firmly the component parts of the wire wheel cover together when the clamping members are fastened together at their central portions. The first clamping member has a flange extending radially outward and axially outward and the second clamping member has a flange extending radially outward and axially inward.

10 Claims, 5 Drawing Figures

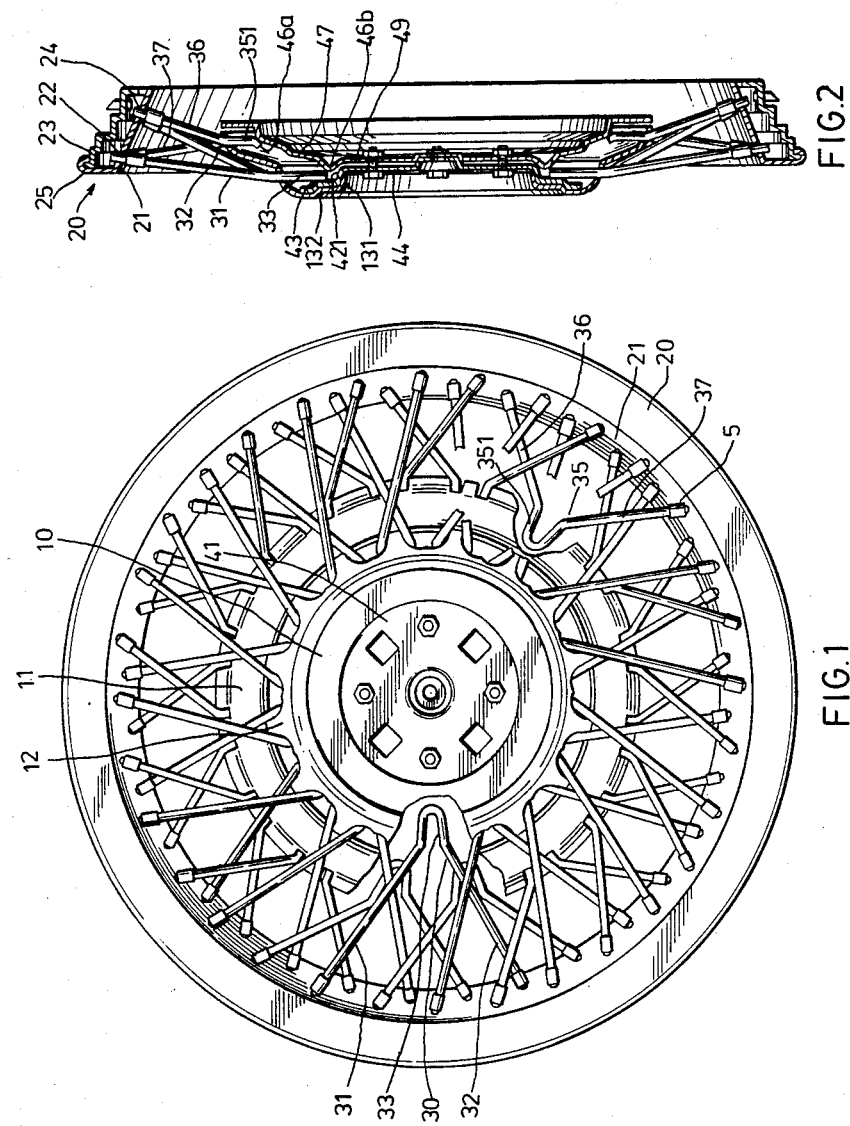

WIRE WHEEL COVER

BACKGROUND OF THE INVENTION

This invention relates to wire wheel cover construction and particularly to a wire wheel cover having a first clamping member with an annular flange extending radially outward and axially outward and a second clamping member with an annular flange extending radially outward and axially inward, the first and second clamping members being incorporated into the hub of the wheel cover and secured together at their central parts to generate a clamping force between their annular flange portions so as to secure firmly the hub, and spoke members to the rim member of the wheel cover.

Simulated wire wheel covers have existed in various forms in the prior art. One form of wire wheel cover includes a plurality of simulated spoke members extending radially between a hub and a rim member. A wire wheel cover of another type includes a base member having a rim portion, a hub connected to the central portion of the base member, and a plurality of spoke members extending radially between the hub and the rim portion. In both types of wire wheel covers, different forms of retention members are provided to secure the hub, spoke members and the rim or base member. The retention means employed heretofore require a lot of fasteners so that much time is needed for the assembly of such wire wheel covers. Examples of the wire wheel covers are disclosed in U.S. Pat. Nos. 4,229,048, 2,792,261, 3,174803, 4,009,911, 3,843,201, 4,178,043 4,221,436, 4,168,016 and 4,422,692.

SUMMARY OF THE INVENTION

An object of the invention is to provide a simulated wire wheel cover with a clamping means by which the component parts of the wire wheel cover can be assemblied with fewer fasteners and secured together more efficiently.

The invention provides a wire wheel cover which includes a hub having an annular portion defining a central opening, a first skirt portion which has apertures spaced apart annularly, extending radially outward and axially inward from the periphery of the annular portion, and a second skirt portion extending radially outward and axially inward from the periphery of the first skirt portion. The periphery of the second skirt portion is provided with notches spaced apart from each other. A rim member having an inner portion of truncated cone shape and an outer retention portion for attachment to the wheel of the vehicle, is provided around the hub. The inner portion has spoke end positioning holes therein.

There is a first clamping member having a central flat circular portion, a flange portion extending radially and axially outward from the outer circumference of the central circular portion, and an annular shoulder between the circular portion and the flange portion. The flange portion of the first clamping member abuts with the inner side of the annular portion of the hub, and annular shoulder portion engages with the inner periphery of the annular portion of the hub.

Between the hub and the rim member are first and second spoke members. The first spoke members have a V-shaped portion and two legs diverging out from the V-shaped portion, and extend radially outward and axially inward between the hub and the rim member. The V-shaped portions are inserted into the apertures of the hub and the apexes of the V-shaped portions engage the flange portion of the first clamping member. The ends of the legs are inserted into the holes of the rim member. Second spoke members have a V-shaped portion extending into the notches of the hub and two legs diverging out from the V-shaped portion and inserted into the spoke positioning holes of the rim member.

There is a second clamping member having a central flat circular portion and a flange portion extending radially outward and axially inward from the outer circumference of the flat circular portion. The flange portion engage the V-shaped portions of the first and second spoke members, and the central circular portion abuts against and is secured to the the center circular portion of the first clamping member so that a clamping force is generated to hold the first and second spoke members, the hub and the rim member firmly together.

It can be appreciated that first and second clamping members according to the present invention are not provided in any of the wire wheel covers disclosed in the above-described U.S. Patents.

The present exemplary preferred embodiment will be described in detail with reference to the following drawings.

BRIEF DESCRIPTION OF THE DRAWINGS

FIG. 1 is an elevation view of a simulated wire wheel cover according to the present invention;

FIG. 2 is a sectional view of the wire wheel cover of FIG. 1; and

DETAILED DESCRIPTION OF THE PREFERRED EMBODIMENT

Figure 3:
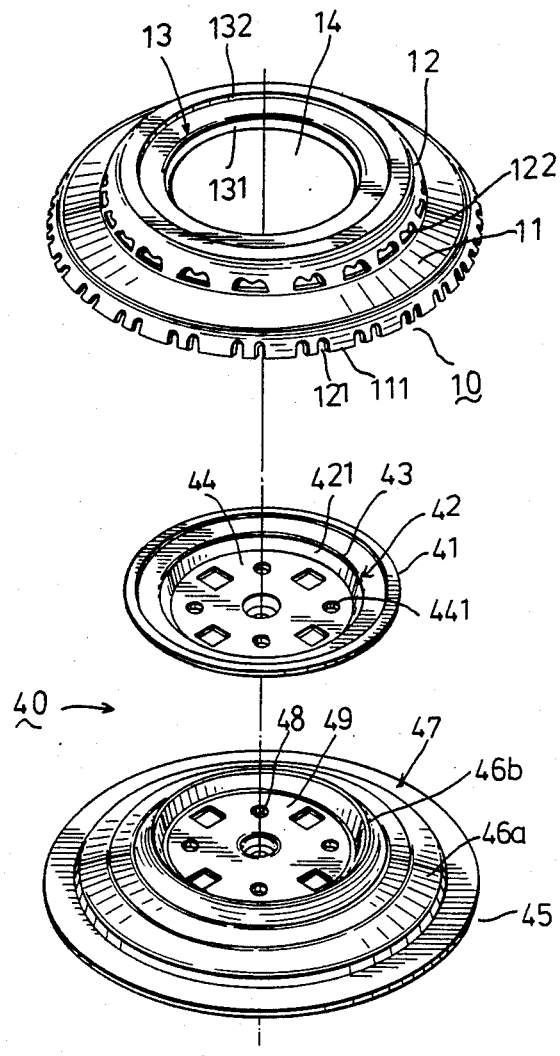
FIG. 3 is an exploded view showing the hub, and first and second clamping members.

Referring to the drawings, there is shown a wire wheel cover which includes a hub 10, a rim member 20, a plurality of first spoke members 30 and a plurality of second spoke members 35 extending between the hub 10 and the rim member 20. The hub 10 has a central circular opening 14 defined by an annular portion 13 having an annular flange 131 extending axially inward from the inner edge thereof, and an annular shoulder portion 132. A first skirt portion 12 extends radially outward and axially inward from the outer end of the annular portion 13 and is provided with apertures 122 annularly spaced apart. From the outer end of the first skirt portion 12 extends a second skirt portion 11 in a direction radially outward and axially inward. Notches 121 are provided at the edge 111 of the second skirt portion 11.

The rim member 20 has an inner portion 21 which is substantially in a truncated cone shape and which is provided with a series of spoke end positioning holes 22 and 24. From the portion 21 extends radially outward a flange 25 to which is attached a retention member 23 which clips on the wheel of the vehicle when the wheel cover is attached to the vehicle wheel.

Spoke members 30 are formed of bent hollow tubes each of which has a V-shaped portion 33 and two diverging legs 31 and 32 provided with simulated nuts 5 at their ends. The legs 32 of the spoke member 30 are bent inward relative to the plane of the legs 31. The V-shaped portions 33 of the spoke members 30 extend to the inner side of the annular portion 13 of the hub 10 through apertures 122, and legs 31 and 32 extend radially outward and axially inward into holes 22 and 24 respectively.

Spoke members 35 are formed of bent hollow tubes each of which has a V-shaped portion 351 and two diverging legs 36 and 37 provided with simulated nuts at their ends. The legs 36 of the spoke member 35 are bent inward relative to the plane of the legs 37. The V-shaped portions 351 extend to the inner side of the second skirt portion 11 of the hub 10 through notches 112, and the legs 36 and 37 extend radially outward and axially inward into holes 24 and 22 respectively.

There is a clamping means 40 which includes a first clamping member 41 and a second clamping member 45. The clamping member 41 has a central circular flat portion 44 provided with screw holes 441, and an annular flange portion 42 which is stepped annularly and extends radially outward and axially outward. Between the annular flange portion 42 and the circular flat portion 44 is an annular shoulder 421. The stepped annular portion 42 itself also has an annular shoulder 43. The clamping member 41 is disposed adjacent to the inner side of the hub with the flange portion 42 extending between the V-shaped portions of the spoke members 30 and the inner side of the annular portion 13 of the hub. The shoulder 421 engages with the flange 131 of the hub 10, and the shoulder 43 of the clamping member 41 engages with the shoulder 132 of the hub 10. The ends of the V-shaped portions 33 of the spoke members 30 engage the inner side of the flange portion 42.

The clamping member 45 has a central flat circular portion 49 with screw holes 48, and an annular flange portion 47 which is stepped annularly and extends radially outward and axially inward from the periphery of the portion 49. The flange portion 47 has an annular engaging portion 46a to engage the V-shaped portions 351 of the second spoke members 35, and an annular engaging portion 46b to engage with the apexes of the first spoke members 30. The annular engaging portion 46b is formed between the circular flat portion 49 and the annular flange portion 47, and projects axially outward from the plane of the circular flat portion 49 to defines a recess cooperatively with the flat portion 49. The central flat circular portion 49 of the clamping member 45 is brought to abut with the circular flat portion 44 of the clamping member 41, receiving it in the formed recess, and screwed thereto by four bolts and four nuts (not shown).

After the clamping members 41 and 45 are screwed together, they generate force to act on the spoke members 30 and 35. The apexes of the V-shaped portions 33 of the spoke members 30 abut against and are clamped between the flange portion 42 of the clamping member 41 and the engaging portion 46b of the inner clamping member 45, and the apexes of the V-shaped portions 351 of the spoke membes 35 engage with the engaging portion 46a of the clamping member 45 which pushes them radially outward toward the inner side of the hub 20, whereby the ends of the legs of the spoke members 30 and 35 are positioned in the holes of the rim member 20 and hub 10, rim member 20 and spoke members 30 and 35 are efficiently held together in a secured position.

It can be appreciated that the component parts of the wheel cover according to the invention can be assembled easily into a secure rattle-free assembly. In assembly, the clamping member 41 is first abutted with the hub 10, and then spoke members 30 and 35 are inserted into notches 112 and apertures 122 of the hub 10 and holes 22 and 24 of the rim member 20. Finally, the clamping member 45 is secured to the clamping member 41 to generate a clamping force to secure spoke members 30 and 35 and the hub 10 at the rim member 20.

Figure 5:
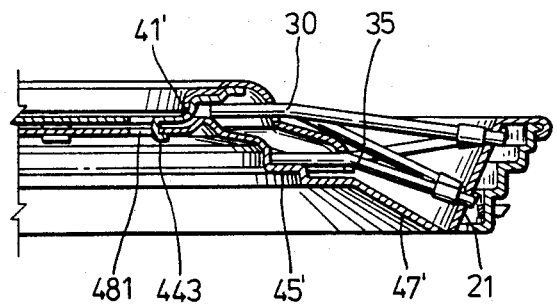
FIG. 5 is a fragmentary sectional view of the wheel cover incorporating the modified clamping members.
Figure 4:
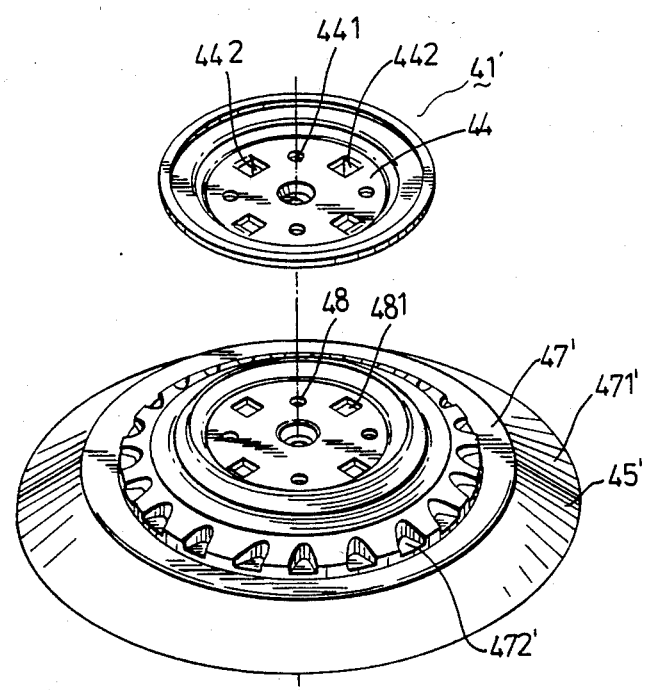
FIG. 4 is an exploded view showing modified outer and inner clamping members.

FIGS. 4 and 5 show modified forms of the clamping member 41 and the clamping member 45 which are designated as 41' and 45' respectively. The modification in the clamping member 41' is that it includes louvers 442 in the central flat circular portion 44, wherein the louvers 442 are formed by a slitting process on a press, and, that when the clamping members 41' and 45' are abutted against one another, the louvers 442 can be projected respectively into holes 481 of the clamping member 45' and bent radially outward to form a hook end 443 to clip the edges bounding the openings 481 of the clamping member 45'. These louvers 442 form a simple and efficient fastener for the two clamping members. The modified clamping member 45' differs from the clamping member 45 in that the flange portion 47' has an outermost skirt portion 471' extending radially to the end of the truncated-cone shaped inner portion 21 of rim 20, and also has recesses 472' disposed annularly in the flange portion 47' to receive and engage with the apexes of the spoke members 35, The recesses 472' provide efficient engagement with the spoke members 35 to secure a positioning effect, and the clamping member 45' provided an extended cover covering entirely the steel wheel assembly so that the whole assembly is in a good trim.

With the invention thus explained, it is apparent that various modifications and variations can be made without departing from the scope of the invention. It is therefore intended that the invention be limited as indicated in the appended claims.

What I claim is:

1. A wire wheel cover for a vehicle comprising:
   a hub having an annular portion defining a central opening, a first skirt portion which has apertures spaced apart annularly, extending radially outward and axially inward from the outer end of the annular portion, and a second skirt portion extending radially outward and axially inward from the outer end of the first skirt portion, the second skirt portion having notches spaced apart from each other at its edge;
   a rim member having an inner portion of truncated cone shape and an outer retention portion for attachment to the wheel of the vehicle, the inner portion having spoke end positioning holes therein;
   a first clamping member having a central flat circular portion, a flange portion extending radially and axially outward from the outer end of the central circular portion, and an annular shoulder between the circular portion and the flange portion, the flange portion of the first clamping member abutting against the inner side of the annular portion of the hub and the annular shoulder engaging the inner periphery of the annular portion of the hub; and first spoke members, each of which has a V-shaped portion and two legs diverging out from the V-shaped portion, extending radially outward and axially inward between the hub and the rim member, the V-shaped portions being inserted into the apertures of the hub, the apexes of the V-shaped portions engaging the inner side of the first clamping member, and the ends of the legs being inserted into the holes of the rim member;

second spoke members, each of which has a V-shaped portion extending into the notches of the hub and two legs diverging out from the V-shaped portion for insertion into the spoke positioning holes of the rim member; and a second clamping member having a central flat circular portion and a flange portion extending radially outward and axially inward from the outer edge of the flat circular portion of the second clamping member, the flange portion engaging the V-shaped portions of the first and second spoke members, the central circular portion of the second clamping member abutting against and being secured to the the central circular portion of the first clamping member so that a clamping force is generated to hold the first and second spoke members, the hub and the rim member firmly together.

2. A wire wheel cover as claimed in claim 1, wherein the annular portion of the hub is stepped annularly and has an inner flange extending axially inward and engaging the annular shoulder portion of the first clamping member.

3. A wire wheel cover as claimed in claim 2, wherein the flange portion of the first clamping member is stepped annularly corresponding to the annular portion of the hub to abut against the annular portion of the hub, and has an engaging portion to engage the V-shaped portion of each of the first spoke members.

4. A wire wheel cover as claimed in claim 1, wherein the flange portion of the second clamping member is stepped annularly and has a first engaging portion to engage with the V-shaped portion of each of the first spoke members and clamp it against the engaging portion of the first clamping member, and a second engaging portion to engage with the V-shaped portion of each of the second spoke members.

5. A wire wheel cover as claimed in claim 4, wherein the first engaging portion of the second clamping member is an annular projection formed between the central flat circular portion and the flange portion and projects outward from the plane of the flat circular portion.

6. A wire wheel cover as claimed in claim 4, wherein the second engaging portion of the second clamping member includes a plurality of recesses which are annularly disposed in the flange portion of the second clamping member and in which are engaged the apexes of the V-shaped portions of the second spoke members.

7. A wire wheel cover as claimed in claim 6, wherein the flat circular portion of the first clamping member is received in the indentation formed by the annular projection and the flat circular portion of the second clamping member.

8. A wire wheel cover as claimed in claim 1, wherein the central circular flat portion of the first and second clamping members are screwed to one another.

9. A wire wheel cover as claimed in claim 1, wherein the central circular flat portion of the first clamping member has louver members projecting inward from the circular flat portion, and the central circular flat portion of the second clamping member has openings therein to receive the louver members, each of the louver members extending through the openings, and the end of each louver member being bent to form a hook to hook up the circular flat portion of the second clamping member.

10. A wire wheel cover as claimed in claim 1, wherein one of the legs of each of the second spoke members is inclined relative to the plane of the other legs of the first spoke members, and one of the legs of each of the second spoke members is inclined relative to the plane of the other legs of the second spoke members.

* * * * *